United States Patent [19]
Javaherian

[11] Patent Number: 4,788,854
[45] Date of Patent: Dec. 6, 1988

[54] METHOD OF ESTIMATING THE FUEL/AIR RATIO OF AN INTERNAL COMBUSTION ENGINE

[75] Inventor: Hossein Javaherian, Troy, Mich.

[73] Assignee: General Motors Corporation, Detroit, Mich.

[21] Appl. No.: 130,945

[22] Filed: Dec. 7, 1987

[51] Int. Cl.⁴ .......................................... G01M 15/00
[52] U.S. Cl. ................................................. 73/117.3
[58] Field of Search ....................... 73/116, 115, 117.3

[56] References Cited
U.S. PATENT DOCUMENTS
4,556,030 12/1985 Aono ................................ 73/116 X OTHER PUBLICATIONS
Houpt, P. K. and Andreadakis, S. K., "Estimation of Fuel-Air Ratio from Cylinder Pressure in Spark-Ignited Engines," SAE Paper No. 830418, 1983.
Gilkey, J. C. and Powell, J. D., "Fuel-Air Ratio Determination from Cylinder Pressure Time Histories," in *Dynamics and Control of Thermofluid Processes and Systems*, ASME Winter Annual Meeting, 1984, pp. 39-45.

Primary Examiner—Jerry W. Myracle
Attorney, Agent, or Firm—Howard N. Conkey

[57] ABSTRACT

A method of estimating the fuel/air ratio of the mixture supplied to an engine is described in which the in-cylinder pressure signal in a combustion cycle is processed to obtain an estimate of the fresh mixture strength supplied to the cylinder. The estimation is obtained by calculating the trapped charge mass and the total fuel mass consumed in a combustion cycle. Based on these values, the fuel/air ratio is estimated.

3 Claims, 2 Drawing Sheets

METHOD OF ESTIMATING THE FUEL/AIR RATIO OF AN INTERNAL COMBUSTION ENGINE

BACKGROUND OF THE INVENTION

This invention relates to a method of estimating the fuel/air ratio of a mixture supplied to an internal combustion engine and particularly to such a method for estimating the fuel/air ratio based on the measurement of the pressure in a cylinder of the engine during the combustion cycle of the cylinder.

In order to obtain the performance and emission objectives for an internal combustion engine, it is necessary to closely control the engine operating parameters. One such parameter is the fuel/air ratio of the fresh mixture delivered to the engine. In current practice, the fuel/air ratio is generally controlled by a closed loop control system in response to an exhaust gas $O_2$ sensor to maintain a desired fuel/air ratio. While $O_2$ sensors provide accurate estimates of the fuel/air ratio, their use in a closed loop control system with the transportation lag inherent in the system results in a sluggish response.

In view of the foregoing, it would be desirable to use the information from a cycle to cycle estimation of the fuel/air ratio to effectively regulate the fuel/air ratio at any desired (including the stoichiometric) value. In accord with this invention such information is obtained from the in-cylinder pressure transducers which have also proved to be highly effective in both detonation detection and spark timing control.

SUMMARY OF THE INVENTION

In this invention, the in-cylinder pressure signal at every cycle in a cylinder is processed to obtain an estimate of the fresh mixture strength supplied to the cylinder so that any deviations from the desired fuel/air ratio can immediately be compensated for in the subsequent cycle(s). This will then provide a faster response time (i.e., higher performance) and would minimize the excursions in the fuel/air ratio during transients.

This invention provides for the estimation of the fuel/air ratio of the mixture supplied to the engine including an estimation of an air/fuel ratio varying from the stoichiometric ratio by calculating the trapped charge mass and the total fuel mass consumed in each or a selected combustion cycle. Based on these values, the fuel/air ratio is estimated. The fuel/air ratio of the mixture supplied to the engine may then be controlled to any desired ratio by a closed loop controller in response of the fuel/air ratio estimated.

SUMMARY OF THE DRAWINGS

The invention may be best understood by reference to the following description of a preferred embodiment of the invention and the drawings in which.

DESCRIPTION OF THE PREFERRED EMBODIMENT

Mathematical Background

First the mathematical equations upon which this invention is based will be derived. The goal of this derivation is to develop a simple quasi-static combustion model for on-line engine control applications that uses pressure data as the input. The pressure, measured as will be described by a transducer mounted in the cylinder, is sampled directly and stored in memory so that this data can be subsequently used at and desired instant of time.

The terms utilized in the expressions contained herein are defined as the end of this specification and before the claims.

Figure 2:
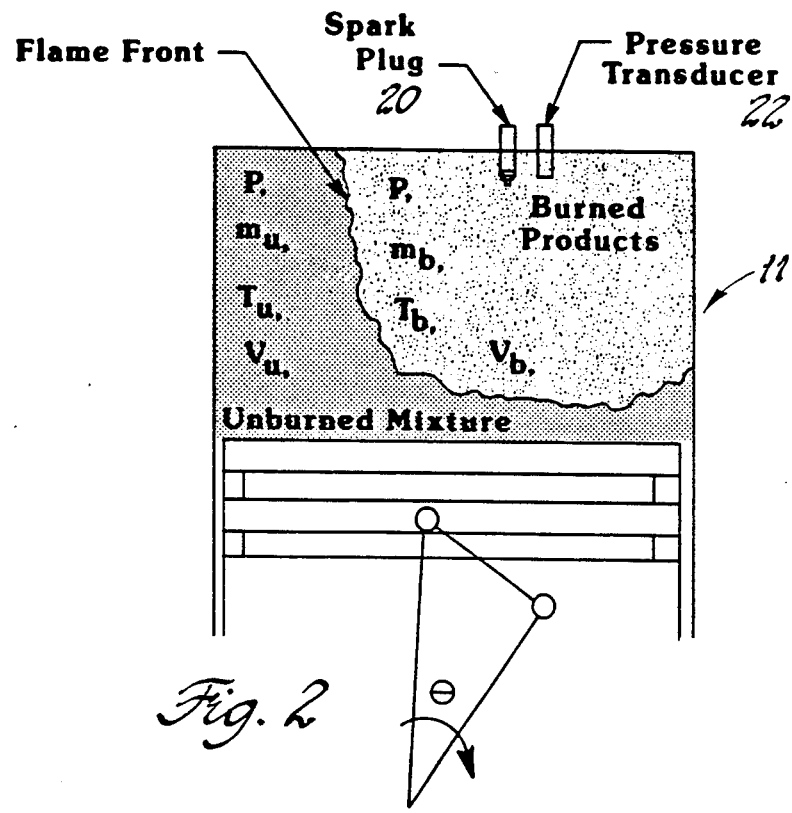
FIG. 2 is a diagram of a two-zone combustion model in a cylinder of an engine.

Consider a two-zone combustion model consisting of the unburned mixture and the burned product gases such as illustrated in the diagram of FIG. 2 which illustrates the combustion chamber in the cylinder of an engine.

From the principle of conservation of energy, we have:

$$\frac{d}{dt} \int_{V(t)} u dV = -p\frac{dV}{dt} + \dot{Q}_r - \dot{Q}_w \quad (1)$$

where u represents the energy density, $\dot{Q}_r$, and $\dot{Q}_w$ are the rates of heat release and heat loss, respectively. As long as the pressure is spatially uniform, the energy density is uniform everywhere and is expressed by:

$$u = \bar{\delta} \cdot P \text{ where } \bar{\delta} = 1/(\bar{\gamma} - 1) \quad (2)$$

for either zone. In the above relation, $\bar{\gamma}$ is an average heat capacity ratio defined by:

$$\bar{\gamma} \triangleq \frac{\bar{R}}{\bar{C}_v} + 1 \text{ where } \bar{C}_v \triangleq \frac{1}{(T - T_o)} \int_{T_o}^{T} C_v(T) dT \quad (3)$$

$T_o$ is taken as the mixture temperature at the beginning of the compression stroke.

The rate of heat release, $\dot{Q}_r$, is proportional to the rate of fuel burning, $\dot{m}_b$:

$$\dot{Q}_r = q \cdot \dot{m}_b \quad (4)$$

where q represents the lower heat value of the fuel.

In view of the spatial uniformity of the energy density u, we can write equation (1) as:

$$\frac{d}{dt}(u_b \cdot V_b + u_u \cdot V_u) = -p\frac{dV}{dt} + \dot{Q}_r - \dot{Q}_w \quad (5)$$

where the total cylinder volume V is given by:

$$V = V_b + V_u \quad (6)$$

Mass conservation of the total charge, m, requires:

$$m = m_b + m_u \quad (7)$$

where $m_b$ and $m_u$ are the masses of the burned and unburned gases, respectively. The ideal gas law, applied to both zones, gives:

$$m_b = (P \cdot V_b)/(R_b \cdot T_b) \quad (8)$$

$$m_u = (P \cdot V_u)/(R_u \cdot T_u)$$

The total trapped mass is determined by the initial thermodynamic state of the charge at the instant of intake valve closure:

$$m = (P_o \cdot V_o)/(R_o \cdot T_o) \qquad (9)$$

The isentropic compression process provides the unburned gas temperature $T_u$ according to:

$$T_u/T_o = (P/P_o)^{1 - 1/\bar{\gamma}_u} \qquad (10)$$

Equations (7)–(10) then give the burned mass as:

$$m_b = m\{1 - (V/V_o - V_b/V_o)(P/P_o)^{1/\bar{\gamma}_u}\} \qquad (11)$$

Integrating equation (5) and substituting for $Q_r$ from equations (4) and (11), we obtain the following nondimensional equation in terms of the volume occupied by the product gases, $V_B$:

$$P/P_i\{\bar{\delta}_b \cdot V_b/V_i + \bar{\delta}_u(V/V_i - V_b/V_i)\} + \qquad (12)$$

$$(q^*/\bar{R}_u T_i)(V/V_i - V_b/V_i)(P/P_i)^{1/\bar{\gamma}_u} -$$

$$(\bar{\delta}_u + q^*/R_u T_i) = - \int_1^{V/V_i} P/P_i d(V/V_i) - Q_w/P_i V_i$$

where subscript $i$ refers to the conditions at the start of combustion. Equation 12 can be solved for $V_b$ when pressure is measured and the heat loss $Q_w$ is known. Other variables such as the burned mass, $m_b$, can then be derived from equation (11).

From equations (11) and (12), we may express the mass fraction burned, in non-dimensional form, as:

$$\mu_b = \{\omega + q_w + \bar{\delta}_u(\tau_u - 1) + \bar{\delta}_b(\pi v - \tau_u)\}/\{\alpha + (\bar{\delta}_u - \bar{\delta}_b)\tau_u\} \qquad (13)$$

The fractional volume occupied by the burned products, from equation 11 is:

$$v_b = v - (1 - \mu_b)\tau_u/\pi \qquad (14)$$

The burned gas temperature, from equation (8) is obtained as:

$$\tau_b = \pi \cdot v_b/(\mu_b \cdot r_b) \qquad (15)$$

and the speed of sound, $a_c$, in the products is:

$$a_c = \sqrt{\bar{\gamma}_b \cdot \bar{R}_b \cdot T_b} \qquad (16)$$

The heat loss, $Q_w$, to the walls of the cylinder is not known a priori. However, for the normal engine operation, the amount of heat loss to the walls during the combustion period of negligible and, hence, with little penalty, can be ignored. With this assumption, the original energy conservation equation (5) after some algebraic manipulation results in the following expression for the mass burning rate in the cylinder:

$$\dot{\mu}_b = \{\pi \dot{v} + \bar{\delta}_b(\pi \dot{v} + \dot{\pi} v) + (\bar{\delta}_u - \bar{\delta}_b)\dot{\pi}/\pi(1 - \bar{\mu}_b)\tau_u/(1 + \bar{\delta}_u)\}/\{\alpha + (\bar{\delta}_u - \bar{\delta}_b)\tau_u\} \qquad (17)$$

i.e., the burning rate explicitly depends on pressure and pressure rate. In order to relate the mass burning rate to the pressure data, two cases are considered:

First, at the location of peak pressure we have:

$$\dot{\mu}_b|_{\theta = \theta_p} = \{(1 + \bar{\delta}_b) \cdot F(\theta_p) \cdot \pi_{max}\}/\{\alpha + (\bar{\delta}_u - \bar{\delta}_b)\tau_u(\theta_p)\} \approx \pi_{max} \qquad (18)$$

From this equation we see that at the location of peak pressure (LPP), the burning rate is proportional to the maximum pressure value at that point. Second, at TDC we have:

$$\dot{\mu}_b|_{TDC} = \dot{\pi}|_{TDC}\{\bar{\delta}_b v + (\bar{\delta}_u - \bar{\delta}_b)(1 - \mu_b) \cdot \tau_u/\pi/(1 + \bar{\delta}_u)\}_{TDC}/\{\alpha + (\bar{\delta}_u - \bar{\delta}_b)\tau_u\}_{TDC} \approx \dot{\pi}|_{TDC} \qquad (19)$$

Hence, at TDC, the burning rate is proportional to the rate of pressure rise at that point.

The foregoing sets forth a derivation of a simple heat release model which depends upon the mean heat capacities and gas constants. Following is a systematic method to arrive at these parameter values.

By definition:

$$\bar{\delta}_u \triangleq \bar{C}_{vu}/\bar{R}_u \text{ and } \bar{\delta}_b \triangleq \bar{C}_{vb}/\bar{R}_b \qquad (20)$$

where the average heat capacities are given by:

$$\bar{C}_{vu}(\bar{T}_u) \triangleq \frac{1}{(\bar{T}_u - T_o)} \int_{T_o}^{\bar{T}_u} C_{vu}(T) \, dT \qquad (21)$$

$$\bar{C}_{vb}(\bar{T}_b) \triangleq \frac{1}{(\bar{T}_b - T_o)} \int_{T_o}^{\bar{T}_b} C_{vb}(T) \, dT$$

and the average gas constants are:

$$\bar{R}_u \triangleq R/M_u, \quad \bar{R}_b \triangleq R/M_b \qquad (22)$$

Temperature dependent heat capacities are evaluated by the following procedure:

(1) calculate gas enthalpy, $H(P, T, \phi)$, for a given air/fuel ratio $\phi$ and pressure P;

(2) differentiate $H(P, T, \phi)$ to obtain $C_p$:

$$C_p \triangleq \left. \frac{\partial h}{\partial T} \right|_{p, \phi} \qquad (23)$$

(3) with disassociation affects accounted for, find molar masses $M_u$ and $M_b$. Then $$\bar{R}_u R/M_u \text{ and } \bar{R}_b = R/M_b \qquad (24)$$

(4) heat capacities at constant volume are given by $$C_{vu}(T) = C_{p, u} - \bar{R}_u$$

$$C_{vb}(T) = C_{p, b} - \bar{R}_b \qquad (25)$$

(5) compute the integrals in equation (21) to obtain the mean heat capacities.

It is clear that the mean gas temperatures $\bar{T}_u$ and $\bar{T}_b$ must be given. At the beginning of the calculations we assume that $\bar{T}_u$ equals $T_i$ (mixture temperature at the time of ignition) and $\bar{T}_b = T_a$ (adiabatic flame temperature). These values will be subsequently refined.

When a combustion reaction proceeds adiabatically, the temperature attained by the end products is the adiabatic flame temperature. With the assumption of no work and no heat transfer, this is the maximum temperature that can be reached for any given reaction.

The adiabatic flame temperature depends on the fuel consumption, reaction pressure, initial mixture temperature, and also fuel/air ratio. The estimation of the adiabatic flame temperature is given by the non-iterative formula:

$$T_a = A_1(P,T)\{1 + A_2(P,T)\ln\phi + A_3(P,T)(\ln\phi)^2\} \tag{26}$$

where the values for $A_1$, $A_2$ and $A_3$ are:

$$A_i = A_{i1} + A_{i2}\ln P + A_{i3}(\ln P)^2, \ (i=1, 2, 3) \tag{27}$$

$$A_{ij} = A_{ij1} + A_{ij2}\ln T + A_{ij3}(\ln T)^2, \ (j=1, 2, 3)$$

The coefficients $A_{ijk}$ for any given fuel are well known.

Next are set forth the expressions for the heat capacities derived from gas entropy. The hydrocarbon air combustion is given by:

$$\epsilon\phi C + 2(1-\epsilon)\phi H_2 + O_2 + \psi N_2 \rightarrow [(2-\epsilon)\phi - 2Y]M_3 + [1-\phi+3Y-U+\psi]M_2 + 2UM_1, \ \phi \leq 1 \tag{23}$$

In this reaction, the disassociation of triatomic molecules to diatomic molecules and the disassocation of diatomic molecules to monoatomic molecules are considered as follows:

$$2M_3 \rightleftharpoons 3M_2 \tag{29}$$

$$M_2 \rightleftharpoons 2M_1$$

The extra number of diatomic molecules Y and the monoatomic molecules U due to the disassociation of triatomic and diatomic molecules, respectively, are calculated from the pressure, temperature and equilibrium constants.

For the hydrocarbon-air combustion reaction given by equation (28), and the disassociations described by equation (29), the entropy of the products for lean mixtures is calculated. The fitted equilibrium constants are:

$$K_1(T) = 5.819\,(10^{-6})\,\text{Exp}\left(0.9674\,\epsilon + \frac{35810}{T}\right) \tag{30}$$

$$K_2(T) = 2.961\,(10^{-5})\,\text{Exp}\left(2.593\,\epsilon + \frac{28980}{T}\right)$$

Approximate values for U and T are:

$$U \approx (2-\epsilon+\psi)(\epsilon-2X)/(4PK_1K_2X), \ Y = X[1+2Z/3+4(1-\phi)/3]^{-\frac{1}{2}} \tag{31}$$

where $$\frac{\epsilon A}{X} = \frac{3(1+2A)(2-\epsilon+\psi) + 2(4-\epsilon+2\psi)A^2}{3(2-\epsilon+\psi) + (4-\epsilon+2\psi)A} \tag{32}$$

$$A^3 = \frac{2-\epsilon+\psi}{4PK_1^2\epsilon}$$

$$Z = \frac{|1-\phi|}{X}$$

With the values of Y and U determined as set forth above, the molar mass is given by $$M_b = m_{cp}/\{1+(1-\epsilon)\phi+\psi+Y+U\} \tag{33}$$

where $m_{cp}$ is the mass of the products in grams per mole $O_2$ reactants given by $$m_{cp} = (8\epsilon+4)\phi + 32 + 28\psi \tag{34}$$

From the molar mass, the gas constants can then be calculated.

The specific entropy of the products is expressed by:

$$h(p,T) = \frac{R}{2m_{cp}}(C_1 T + C_2 \overline{T}_v + \overline{h}_f) \tag{35}$$

where $$C_1 = 7 + (9 - 8\epsilon)\phi + 7\psi + 5Y + 3U$$

$$C_2 = 2\{1 + (5-3\epsilon)\phi + \psi - 3Y - U\}$$

$$\overline{T}_v = \frac{T_v}{\exp(T_v/T) - 1} \tag{36}$$

$$T_v = \frac{3256 - 2400\epsilon + 300\psi}{1 - 0.5\epsilon + 0.09\psi}$$

$$\overline{h}_f = (121500 + 29590\epsilon)Y + 117500U + (20372\epsilon - 114942)\phi$$

By direct differentiation of the above enthalpy function we obtain $$C_p(T) \stackrel{\Delta}{=} \left.\frac{\partial h}{\partial T}\right|_{P,\phi} = \tag{37}$$

$$\frac{R}{2m_{cp}}\left(C_1 + T\frac{\partial C_1}{\partial T} + C_2\frac{\partial \overline{T}_v}{\partial T} + \overline{T}_v\frac{\partial C_2}{\partial T} + \frac{\partial \overline{h}_f}{\partial T}\right)_{P,\phi}$$

Using equation 37, expressions for the terms in $C_p(T)$ are easily obtained.

The instantaneous fuel-mass burned at any crankshaft position can now be calculated from the pressure data. Assuming a negligible amount of heat loss to the walls during the combustion phase, and using the first law of thermodynamics, we have $$qm'_f = (\overline{\delta}_b P_f V_f - \overline{\delta}_u P_i V_i) + \omega_f \tag{38}$$

where $\omega_f$ is the work done by the system from the initial state to the approximate end of combustion (where $\mu_b \approx 1$) and $m'_f$ is the mass of fuel burned between the initial state and the approximate end of combustion.

Based on the foregoing derived model, the fuel/air ratio of the mixture supplied to the engine is estimated in accord with the following steps for each cylinder during each engine cycle:

(1) compute the mass m of the trapped charge in the cylinder in accord with equation (9);
(2) assume an initial estimated value of the fuel/air ratio $\Phi$ to be a value such as the stoichiometric ratio $\Phi s$;

(3) repeatedly sample and store in a history table the gas pressure in the cylinder and the engine crank angle corresponding thereto during the combustion phase;

(4) estimate the instantaneous mass fraction burned, $\mu_b$, during combustion for each of the sampled gas pressures based on equation (13) for the estimated fuel/air ratio unitl the estimated mass fraction burned represents substantially complete combustion;

(5) calculate the mass burned $m'_f$ based on equation 38;

(6) compute the total fuel mass burned during combustion by the expression $$m_f = m'_f / \mu_b \qquad (39)$$

(7) derive an estimate for the fuel/air ratio from the expression $$\Phi = m_f/m_a = m_f/(m - m_f) \qquad (40)$$

where m is fixed at step (1);

(8) repeat the steps (4) thru (7) with the new estimate of $\Phi$ until consecutive estimates of the fuel/air ratio are substantially equal.

Upon the convergence of the procedure, a unique fuel/air ratio is obtained.

HARDWARE AND SOFTWARE DESCRIPTION

Figure 1:
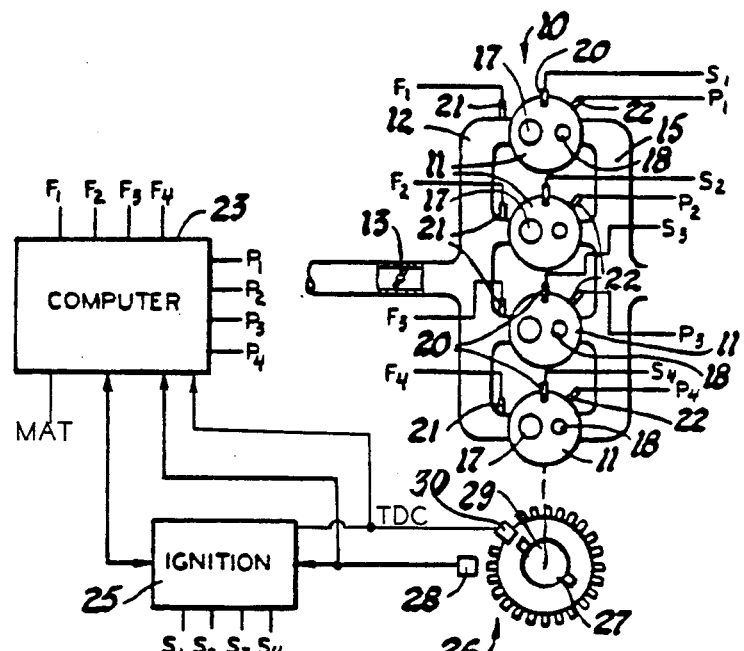
FIG. 1 is a schematic diagram of an engine and controller that functions to estimate the fuel/air ratio of the mixture supplied to the engine in accord with the principles of this invention.

Apparatus capable of controlling an internal combustion engine and estimating the fuel/air ratio of the mixture supplied thereto in accord with the principles as set forth above is shown schematically in FIG. 1. Engine 10 is a spark ignited internal combustion engine having four combustion chambers or cylinders 11, an intake manifold 12 with a throttle 13, an exhaust manifold 15 and a rotating crankshaft, not shown, through which power is transferred from cylinders 11 to the vehicle drive train. Each cylinder 11 is provided with an intake valve 17 communicating with intake manifold 12, an exhaust valve 18 communicating with exhaust manifold 15, a spark plug 20, a fuel injector 21 in the intake manifold 12 adjacent intake valve 17 and a combustion chamber pressure sensor 22. While not illustrated, a conventional temperature sensor is positioned in the intake manifold 12 to sense the manifold air temperature MAT.

While a particular engine configuration has been illustrated, the invention is applicable to other configurations including engines having a different number of cylinders and a different number of valves and spark plugs for each cylinder.

Computer 23 is a digital computer including the standard elements of central processing unit, random access memory, read only memory, analog-to-digital converter, input/output circuitry and clock circuitry. Appropriate inputs and outputs are indicated for sending signals from the computer 23 to fuel injectors 21 (F1-F4) and spark plugs 20 (S1-S4) and to computer 23 from pressure sensors 22 (P1-P4) and the manifold air temperature sensor (MAT). The computer may be a variant of those used for computerized engine control on prior art vehicles based on the Motorola 68000 ® Series Microprocessor. Spark plugs 20 and fuel injectors 21 are of the type normally used in the prior art.

Combustion chamber pressure sensors 22 may be any known type of pressure sensor adapted or adaptable to sensing the pressure inside the combustion chambers 11.

The pressure transducer is required to have a linear response (or any nonlinearity modelled and compensated) but no gain and bias calibration is needed. The bias (i.e., pressure offset) may be automatically computed at every combustion cycle and the gain value does not enter into the scheme for fuel/air ratio estimation.

The pressure offset is derived from the fact that the process during the compression stroke between any two close points (e.g. $90 \pm 10$ degrees BTDC) can be taken to be adiabatic. Let the actual pressure be P, the measured pressure $P_m$, transducer offset $P_{off}$ and the transducer gain K. Then:

$$P = K(P_m + P_{off}). \qquad (41)$$

For the adiabatic process where $PV^\gamma$ is constant and for any two points we have:

$$P_1/P_2 = (V_2/V_1)^\gamma \qquad (42)$$

or $$K(P_{m1} + P_{off})/K(P_{m2} + P_{off}) = (V_2/V_1)^\gamma \qquad (43)$$

From the above relation, the pressure offset is determined as $$P_{off} = \gamma P_{m2}(V_2/V_1)^\gamma - P_{m1}\}/\{1 - (V_2/V_1)^\gamma\} \qquad (44)$$

One sensor which might be appropriate is a piezoelectric deflection type of transducer which includes a finger projecting through the cylinder water jacket to sense pressure caused deflections of the combustion chamber wall. Another sensor which might be appropriate is a piezoelectric sensor attached directly to the combustion chamber wall. Sensors with membranes of piezoelectric or other materials (such as fiber optics) exposed directly to the combustion chamber interior or combined with the spark plug are further possibilities.

An ignition circuit 25 is effective when signalled by computer 23 to generate a high voltage pulse to activate a spark plug 20 and to direct the pulse to the proper plug. The circuit 25 may include the standard distributor and take any appropriate form from the prior art.

Signals indicative of crankshaft rotational position are provided by a ring gear 27 having teeth spaced around its periphery and which is rotated by the crankshaft. An electromagnetic sensor 28 is positioned to sense the teeth on the ring gear as it is rotated by the engine crankshaft to provide crank position pulses to the computer 23 and the ignition circuit 25.

Signals TDC representing the top dead center position of each of the cylinders of the engine 10 or some predetermined angular position related thereto is provided by a disc member 29 also rotated by the crankshaft and which has teeth spaced at 180 degree intervals. A sensor 30 is positioned to sense the teeth on the member 29 for providing a TDC pulse to the computer 23 and the ignition circuit 25 at each piston top dead center position or some predetermined angle related thereto.

The signal pulses from the crankshaft position sensor 28 may be used to generate interrupts which in turn may simply trigger a counter or increment a memory location cleared with each top dead center position signal output of the sensor 29 so as to keep track of the angular position of the engine crankshaft after top dead center position of each cylinder.

Figure 3:
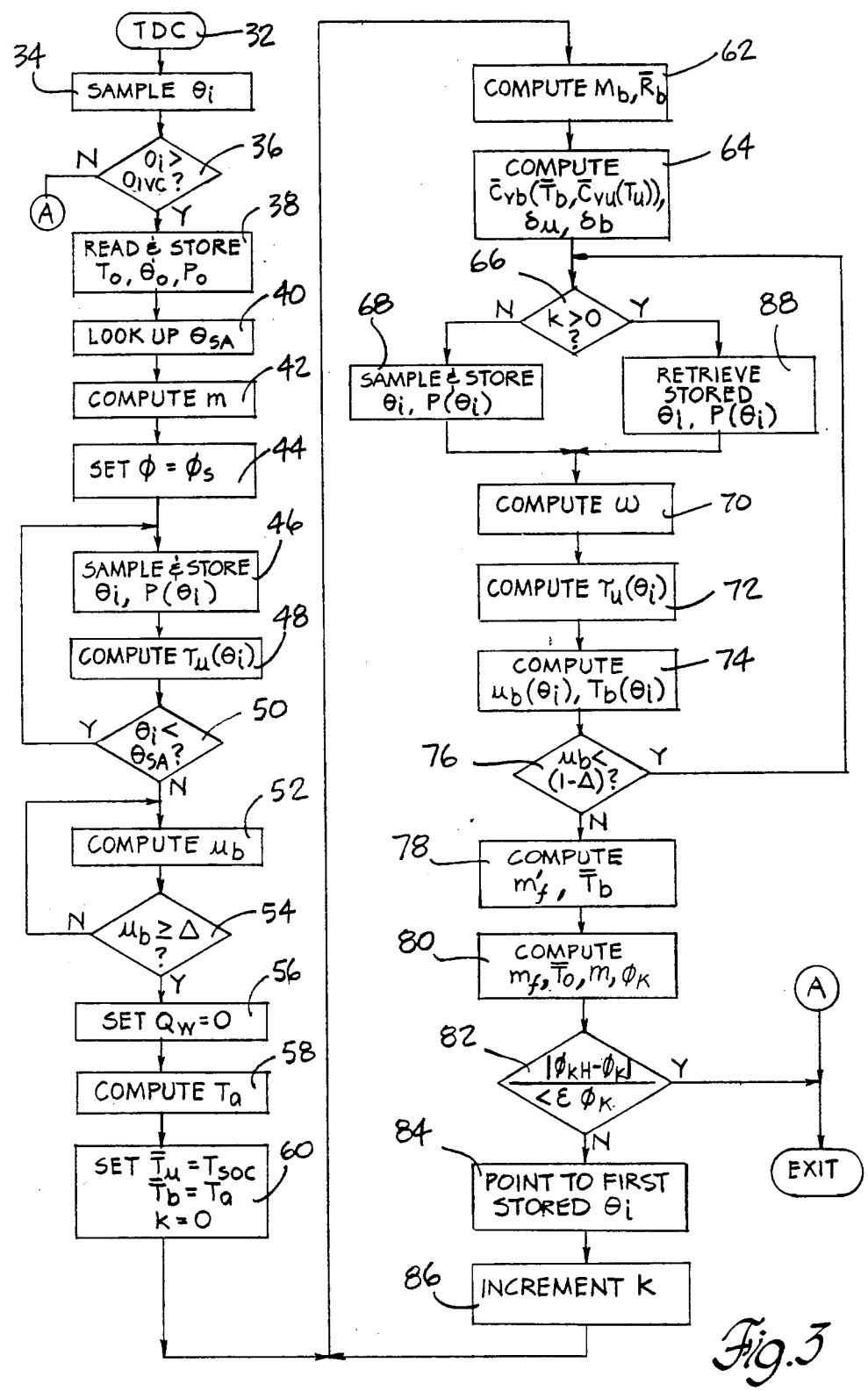
FIG. 3 is a flow diagram illustrating the operation of the controller of FIG. 1 in estimating the fuel/air ratio of the mixture supplied to the engine.

The computer 23 responds to each top dead center signal (TDC) output of the sensor 29 to initiate an operating program stored in memory for estimating the fuel/air ratio of the mixture supplied to the respective cylinder associated with the TDC signal. The flow diagram of FIG. 3 illustrates the series of steps in the stored routine that are executed by the computer in response to each TDC signal to determine or estimate the fuel/air ratio of the mixture supplied to one of the cylinders. The programming of the computer 23 to implement the series of steps as set forth in FIG. 3 should be clear to any programmer skilled in the art of engine control.

In the following description of the computer operation in estimating the fuel/air ratio of the mixture supplied to the engine, the heat loss to the walls of the cylinder 11 during the short period of combustion is assumed to be negligible.

Referring to the program steps of FIG. 3, the program begins at step 32 and proceeds to a step 34 where it samples and stores the angular rotation $\theta_i$ of the crankshaft of the engine 10 from the top dead center position signal. As previously described, this angle may be provided by a counter or register that is reset upon the receipt of each top dead center signal and which counts the output of the sensor 28 representing the angular rotation of the crankshaft output of the engine 10. The number counted in conjunction with the angular spacing of the teeth on the ring gear 27 provides for the angular rotation of the engine from the position represented by the TDC pulse.

The program next proceeds to a step 36 where it determines whether or not the engine angular position is at the position of intake valve closure. This is accomplished by comparing the angle $\theta_i$ sampled at step 34 with the angle $\theta_{ivc}$ representing the crank angle at intake valve closure. If the intake valve has not yet closed, the program exits the routine of FIG. 3.

When step 36 detects engine rotation to the position at which the intake valve of the cylinder corresponding to the TDC signal closes, the program proceeds from step 36 to a step 38 where the computer 23 determines and stores various input conditions. Specifically, the temperature $T_o$ of the trapped charge is determined, the engine crank angle position $\theta_o$ at time of valve closure (the last value of the angle $\theta_i$ sampled at step 34) is stored and the trapped charge pressure $P_o$ of the mixture measured by the pressure transducer measuring the pressure in the respective cylinder is sampled and stored. For the first cycle of engine operation after startup, the determined value of $T_o$ is assumed to be the value of the sensed manifold air temperature represented by the signal MAT provided to the computer. In the subsequent cycles of engine operation, the value of $T_o$ is set equal to a value calculated during the previous cycle as will subsequently be described.

At step 40, the program determines the spark advance angle $\theta_{sa}$ for energizing the spark plug 20 for the current engine operating condition. Next at step 42, the routine computes the total trapped mass m in the cylinder determined by the initial thermodynamic state of the charge at the instant of intake valve closure in accord with equation (9). The same mass can alternatively be determined from the thermodynamic states corresponding to the time of ignition. At step 44, the initial value of an assumed fuel/air ratio is set equal to a predetermined value such as the stoichiometric ratio $\Phi_s$.

The program next executes a series of steps to determine when the engine position has reached the spark advance angle determined at step 40. This is accomplished beginning at step 46 where the program samples and stores the current engine angular position $\theta_i$, and also samples and stores the current pressure $P(\theta_i)$ in the cylinder. At step 48, the program calculates the normalized temperature value $\tau_u$ at the angle $\theta_i$ stored at step 46 in accord with the expression $\tau_u = T_u/T_i$ based on the unburned gas temperature $T_u$ obtained via the equation (10).

At step 50, the program determines whether the engine has attained the spark advance angle $\theta_{sa}$ determined at step 40. If not, the program repeats the steps 46 thru 50. When the engine angular position attains the spark advance angle, the program proceeds from step 50 to a step 52 where the mass fraction burned $\mu_b$ is determined in accord with the equation (13). As previously indicated, the heat loss to the cylinder wall is assumed negligible so that the term $Q_w$ is zero.

The value of mass fraction burned at step 52 will actually be zero until combustion of the mixture begins after which the determined mass fraction burned begins to increase. Step 54 determines this condition by comparing the mass fraction burned calculated at step 52 with some small incremental value. If step 54 indicates that combustion has not yet started, the program returns to step 52 where the mass fraction burned is again determined for an incremented crank angle. In this respect, the step 52 includes the provision for proceeding with sampling the various signals required to compute the value of the mass fraction burned. It should also be noted that the volume in the cylinder varies as a function of the angle of the engine and can be directly obtained from a table lookup stored in the computer.

In another embodiment, it could be assumed that when the engine attains the spark advance angle, combustion is initiated and the steps 52 and 54 could be eliminated.

At step 56, the value of $Q_w$ is set to zero. As previously indicated for purposes of this embodiment of the invention, heat loss to the wall is assumed to be negligible and is set to zero.

At step 58, the program estimates the adiabatic flame temperature in accord with equation (26). Thereafter, at step 60, the program sets the mean value of the unburned gas temperature equal to the temperature at the detected start of combustion which is the value of $T_u$ last determined at step 48 in the determination of the normalized temperature $\tau_u$. Additionally, the mean value of the burned gas temperature is set equal to the adiabatic flame temperature computed at step 58 and a value of k representing a number of program iterations is set to zero.

In the next series of steps, the program checks for the completion of combustion represented by the mass fraction burned approaching unity. When the end of combustion is approached, the fuel/air ratio is determined and compared to its assumed value. The steps are then repeated based on stored values until the value of fuel/air ratio calculated converges on a unique fuel/air ratio.

At step 62, the molar mass of the burned products $M_b$ is determined in accord with equation (33) and the mean value of the universal gas constant of the burned gases $R_b$ is determined in accord with equation (24). It is noted that the molar mass and the mean value of the universal gas constant of the unburned mixture are known constants.

At the next step 64, the program computes the mean value of the average heat capacities $\overline{C}_{vu}(\overline{T}_b)$ and $\overline{C}_{vb}(\overline{T}_b)$ in accord with equation (21) and computes the values $\overline{\delta}_u$ and $\overline{\delta}_b$ in accord with the equation (20). Thereafter, at step 66, the program determines whether or not this is the first iteration in the estimation of the fuel/air ratio of the mixture in the cylinder. In this regard, a value k in a register is compared to zero to determine whether or not a first estimation of the fuel/air ratio has been made. If zero, indicating that a first estimation has not been made, the program proceeds to a step 68 where the present engine position and the cylinder pressure corresponding thereto is sampled and stored in a history table in memory. As will be described, a number of values of engine angular positions and corresponding pressures will be stored in memory to form a history of those values during repeated executions of the step 68. Each of these values are stored in separate memory locations so that a history of the engine pressure values as a function of engine angular position are stored.

Following step 68, the program proceeds to a step 70 where a value of $\omega$ representing non-dimensional work is calculated. This value is utilized in the calculation of the mass fraction burned in equation (13). At step 72, the program determines the present normalized temperature value $\tau_u$. This value is utilized in determining the mass fraction burned in equation (13).

At step 74, the program computes the mass fraction burned at the angle sampled at step 68 in accord with equation (13) and then calculates the value of the burned gas temperature at the angle sampled at step 68 by first calculating the value of $\tau_b$ by equation (15) and then calculating the value of $T_b$ from the definition of $\tau$ given hereafter.

The program next determines whether or not complete combustion has taken place based on the mass fraction burned being substantially equal to unity. In this respect, at step 76, the program compares the value of the mass fraction burned determined at step 74 with a number substantially equal to unity. If the value is less than a value substantially equal to unity representing incomplete combustion, the program returns to step 66 after which the steps 68 thru 74 are repeated at a new engine angular position and pressure.

When step 76 determines that the combustion in the engine is substantially complete, the program proceeds to a step 78 where the value of the mass burned $m'_f$ up to the present engine angle is computed via equation (38) and the average product temperature $\overline{T}_b$ during the cycle is computed from the instantaneous temperature $T_b$.

At step 80, the total fuel mass burned $m_f$ is determined in accord with equation (39). Thereafter, a new value of the trapped charge temperature $T_o$ upon which the trapped charge mass m is based is estimated and averaged with prior estimated values to obtain an average value $T_o$, a new determination of the trapped charge mass m is calculated based on equation (9) and the value of the fuel/air ratio is estimated in accord with equation (40). The estimation of the trapped charge temperature $T_o$ at the instant of intake valve closure in step 80 is derived independent of the MAT signal (used in the first cycle of engine operation as described in regard to step 38) from the following ideal gas relation:

$$T_o = P_o \cdot V_o / \{(1 + 1/\Phi) \cdot R_u \cdot (qm_f)/q\} \quad (45)$$

where $qm_f$ was previously calculated in step 80 and $\Phi = 1/14.6$. Then as $T_o$ is associated with a diffusion process and hence, even under dynamic loading, changes only slowly, the average $T_o$ over a number of cycles is determined and used in the computation of the total trapped charge mass m at step 42 in the next combustion cycle.

At step 82, the program determines whether or not the value of the fuel/air ratio determined at step 80 has converged on the unique value of the ratio of the mixture supplied to the cylinder. This is determined by computing the fractional change of the fuel/air ratio and comparing it to some small incremental value. If the change is greater than this value indicating that a unique value of fuel/air ratio has not yet been determined, the program proceeds to a step 84 where a pointer is set to point to the first stored value of engine angular position stored at step 68 and the pressure value corresponding thereto. At step 86, the value of k is incremented indicating a first pass of the fuel/air ratio estimation has been completed.

The program then proceeds to the previously described steps 62 and 64. However, at step 66, it is determined that a first estimation of the fuel/air ratio has been made (the value of k greater than zero). As a result, the program bases the remainder of its calculations on the stored history of values of cylinder pressure values. This is accomplished at step 88 where the program retrieves the stored value of engine angular position and the pressure corresponding thereto. As previously described in regard to step 84, the first such stored value was pointed to and thereby retrieved. The step 88 then increments the pointer to the next stored value so that upon next execution of step 88 the subsequent stored value is then utilized.

From step 88, the program repeats the steps 70 thru 76 previously described. The foregoing steps 66, 88 and 70 thru 76 are thereafter continually repeated until such time that the value of the mass fraction burned again indicates complete combustion as previously described. The program then again executes the steps 78 thru 82 to again estimate the fuel/air ratio and to determine whether or not the estimated fuel/air ratio has converged on the unique ratio of the mixture supplied to the cylinder. If not, the foregoing steps are again repeated.

After repeat executions of the foregoing steps, the estimated value of the fuel/air ratio will converge on a unique value. This condition is detected at step 82 at which time the program exits the routine. The unique value last estimated at step 80 then represents the determined fuel/air ratio of the mixture supplied to the cylinder of the engine at the respective combustion cycle.

The foregoing description of a preferred embodiment of the invention for the purposes of illustrating the invention is not to be considered as limiting or restricting the invention since many modifications may be made by the exercise of skill in the art without departing from the scope of the invention.

NOMENCLATURE TABLE $A_b$: Cylinder area in contact with hot gases
$a_c$: Speed of sound in the chamber
$C_h$: Convective heat transfer coefficient
$C_p$: Specific heat capacity at constant pressure
$C_v$: Specific heat capacity at constant volume D: Cylinder diameter
$f_c$: Acoustic resonance frequency of the chamber
h: Specific enthalpy
$m_{cp}$: Mass of the products
m: Mass
$M_1, M_2, M_3$: Monoatomic, diatomic, and triatomic molecules, respectively
M: Molar mass
N: Engine speed
P: Pressure
$Q_w$: Heat loss
$Q_r$: Heat release
q: (lower) Calorific vlue of the fuel
$q^* = q/(1+m_a/m_f)$
$q_w = Q_w/p_i v_i$, nondimensional heat loss
R: Universal gas constant
$R_u, R_b$: Gas constants for the mixture and products, respectively
$r_b = \bar{R}_b/\bar{R}_u$, ratio of average gas constants
T: Temperature
$T_a$: Adiabatic flame temperature
t: Time
U: Extra number of monoatomic molecules due to the dissociation of diatomic molecules
u: Energy density
V: Volume
$V_p$: Average piston speed
W: Work
Y: Extra number of diatomic molecules due to the dissociation of triatomic molecules
$\alpha = q^*/\bar{R}_u T_i$
$\gamma = C_p/C_v$, specific heat ratio
$\Delta$: Molar C:H ratio in the hydrocarbon, or a small number
$\delta_u, \delta_b = \bar{C}_{vu}/\bar{R}_u, \bar{C}_{vb}/\bar{R}_b$, respectively
$\epsilon = 4\Delta/(1+4\Delta)$, or a small number
$\eta_{th}$: Indicated thermal efficiency
$\theta$: Crank-angle $$\kappa = \frac{C_p \mu}{0.7},$$

thermal conductivity of the gas
$\lambda$: A geometric constant for the chamber
$\mu$: Gas viscosity
$\mu_b = m_b/m$, mass-fraction burned
$\nu = V/V_i$, volume fraction
$\pi = P/P_i$, pressure ratio
$\rho$: Gas density
$\tau = T/T_i$, temperature ratio
$\Phi = m_f/m_a$, fuel-air ratio
$\phi = \Phi/\Phi_s$, fuel-air equivalence ratio
$\Phi$: N:0 ratio in the mixture (for air $\approx 3.76$)

$$\omega = \int_1^\nu \pi d\nu,$$

nondimensional work

SUBSCRIPTS a: Air
b: Burned
f: Fuel or final
i: Ignition
o: Trapped-charge condition
p: Peak
s: Stoichiometric
u: Unburned
w: Wall

SUPERSCRIPTS

—: Mean value
·: Time derivative

The embodiments of the invention in which an exclusive property or privilege is claimed are defined as follows:

1. A method of estimating the ratio of the air and fuel mixture supplied to a cylinder of an internal combustion engine through an intake valve that is closed upon completion of the intake phase of the cylinder to trap an air-fuel charge in the cylinder at a predetermined crank angle during rotation of an output crankshaft of the engine, the intake phase being followed by a compression phase and a combustion phase as the engine crank angle increases, the method comprising the steps of:

(a) determining the trapped charge mass m in the cylinder;
   (b) setting an initial estimated fuel/air ratio value;
   (c) for the estimated fuel/air ratio, determining the gas pressure in the cylinder and the engine crank angle corresponding thereto at which the mass fraction burned $\mu_b$ during combustion represents substantially complete combustion;
   (d) determining the mass burned $m'_f$ based on the pressure and crank angle at which the mass fraction burned $\mu_b$ during combustion represented substantially complete combustion;
   (e) computing the total fuel mass burned $m_f$ during combustion from the value of $m'_f$;
   (f) estimating the fuel/air ratio of the mixture supplied to the cylinder from the values of m and $m_f$; and
   (g) repeating steps (c) through (f) for each value of pressure and engine angle stored in the history table until consecutive values of the estimated fuel/air ratio are substantially equal, the last estimated value of the fuel/air ratio being a measure of the fuel/air ratio of the mixture supplied to the cylinder.

2. A method of estimating the ratio of the air and fuel mixture supplied to a cylinder of an internal combustion engine through an intake valve that is closed upon completion of the intake plase of the cylinder to trap an air-fuel charge in the cylinder at a predetermined crank angle during rotation of an output crankshaft of the engine, the intake phase being followed by a compression phase and a combustion phase as the engine crank angle increases, the method comprising the steps of:

(a) determining the trapped charge mass m in the cylinder;
   (b) setting an initial estimated fuel/air ratio value;
   (c) repeatedly sampling and storing in a history table the gas pressure in the cylinder and the engine crank angle corresponding thereto during the combustion phase;
   (d) for the estimated fuel/air ratio, estimating the instantaneous mass fraction burned $\mu_b$ during combustion for each of the sampled gas pressures until the estimated value of $\mu_b$ represents substantially complete combustion;
   (e) determining the mass burned $m'_f$ based on the pressure and crank angle at which $\mu_b$ was determined at step (d) to indicate substantially complete combustion;

(f) computing the total fuel mass burned $m_f$ during combustion from the values of $\mu_b$ and $m'_f$;

(g) estimating the fuel/air ratio of the mixture supplied to the cylinder from the values of m and $m_f$; and (h) repeating steps (d) through (g) for each value of pressure and engine angle stored in the history table until consecutive values of the estimated fuel/air ratio are substantially equal, the last estimated value of the fuel/air ratio being a measure of the fuel/air ratio of the mixture supplied to the cylinder.

3. A method of estimating the ratio of the air and fuel mixture supplied to a cylinder of an internal combustion engine through an intake valve that is closed upon completion of the intake phase of the cylinder to trap an air-fuel charge in the cylinder at a predetermined crank angle during rotation of an output crankshaft of the engine, the intake phase being followed by a compression phase and a combustion phase as the engine crank angle increases, the method comprising the steps of:

(a) determining the trapped charge mass m in the cylinder;

(b) setting an initial estimated fuel/air ratio value;

(c) repeatedly sampling and storing in a history table the gas pressure in the cylinder and the engine crank angle corresponding thereto during the combustion phase;

(d) for the estimated fuel/air ratio, estimating the instantaneous mass fraction burned $\mu_b$ during combustion for each of the sampled gas pressures until the estimated value of $\mu_b$ represents substantially complete combustion;

(e) determining the mass burned $m'_f$ based on the pressure and crank angle at which $\mu_b$ was determined at step (d) to indicate substantially complete combustion;

(f) computing the total fuel mass burned $m_f$ during combustion from the values of $\mu_b$ and $m'_f$;

(g) estimating the temperature $T_o$ of the trapped charge from the total fuel burned $M_f$ and an average of the estimated fuel/air ratios;

(h) redetermining the trapped charge mass m from the estimated temperature $T_o$;

(i) estimating the fuel/air ratio of the mixture supplied to the cylinder from the values of m and $m_f$; and (j) repeating steps (d) through (g) for each value of pressure and engine angle stored in the history table until consecutive values of the estimated fuel/air ratio are substantially equal, the last estimated value of the fuel/air ratio being a measure of the fuel/air ratio of the mixture supplied to the cylinder.

* * * * *